US007956550B2

(12) United States Patent
Nerone

(10) Patent No.: US 7,956,550 B2
(45) Date of Patent: Jun. 7, 2011

(54) COMPLEMENTARY APPLICATION SPECIFIC INTEGRATED CIRCUIT FOR COMPACT FLUORESCENT LAMPS

(75) Inventor: Louis R. Nerone, Brecksville, OH (US)

(73) Assignee: General Electric Company, Schenectady, NY (US)

( * ) Notice: Subject to any disclaimer, the term of this patent is extended or adjusted under 35 U.S.C. 154(b) by 439 days.

(21) Appl. No.: 12/044,150

(22) Filed: Mar. 7, 2008

(65) Prior Publication Data

US 2009/0224683 A1 Sep. 10, 2009

(51) Int. Cl.
H05B 41/16 (2006.01)

(52) U.S. Cl. .................... 315/287; 315/224; 315/291

(58) Field of Classification Search .................. 315/205, 315/224–225, 246, 268, 272, 287, 291, 307
See application file for complete search history.

(56) References Cited

U.S. PATENT DOCUMENTS

| | | | |
|---|---|---|---|
| 4,170,747 A * | 10/1979 | Holmes | 315/307 |
| 5,986,410 A | 11/1999 | Nerone | |
| 6,628,090 B1 | 9/2003 | Scollo | |
| 6,756,746 B2 | 6/2004 | Nerone et al. | |
| 6,847,175 B2 | 1/2005 | Nerone | |
| 6,891,339 B2 * | 5/2005 | Ribarich et al. | 315/291 |
| 7,408,307 B2 * | 8/2008 | Ribarich | 315/291 |
| 2002/0011801 A1 * | 1/2002 | Chang | 315/219 |
| 2002/0096779 A1 | 7/2002 | Feldtkeller et al. | |
| 2002/0140369 A1 * | 10/2002 | Rudolph | 315/209 R |
| 2002/0140371 A1 | 10/2002 | Chou et al. | |
| 2003/0006720 A1 * | 1/2003 | Borella et al. | 315/291 |
| 2004/0207335 A1 | 10/2004 | Nerone et al. | |
| 2007/0182339 A1 * | 8/2007 | Van Meurs et al. | 315/209 M |
| 2008/0309256 A1 * | 12/2008 | Wang et al. | 315/307 |
| 2009/0128057 A1 * | 5/2009 | Valdez | 315/307 |

OTHER PUBLICATIONS

PCT/US2009/031856 International Search Report, mailed Apr. 4, 2009.

* cited by examiner

*Primary Examiner* — Douglas W Owens
*Assistant Examiner* — Tung X Le
(74) *Attorney, Agent, or Firm* — Fay Sharpe LLP

(57) ABSTRACT

In a lighting ballast there are typically several discrete components that combine to take an external AC signal and convert it to a DC signal, and back to an AC signal for powering a lamp. Several of these components can be housed on an application specific integrated circuit. By placing switching transistors (20, 22) their companion diodes (34, 36), and a rectifying circuit (52) on a monolithic integrated circuit (60), the ballast circuit as a whole is made more reliable and robust and can be manufactured at a lower cost than if discrete components had been used.

16 Claims, 3 Drawing Sheets

US 7,956,550 B2

COMPLEMENTARY APPLICATION SPECIFIC INTEGRATED CIRCUIT FOR COMPACT FLUORESCENT LAMPS

BACKGROUND OF THE INVENTION

The present invention relates to lamp ballasts. It finds particular application in simplifying lamp ballast circuitry through the use of application specific integrated circuits (ASICs) and will be described with particular reference thereto. It is to be appreciated, however, that the present invention is also applicable to other circuits as well as lamp ballasts, and is not limited to the aforementioned application.

Typical lamp ballasts driven off of a direct current (DC) bus signal include a pair of transistors that convert the DC signal to an alternating current (AC) signal for driving a lamp operably connected to the ballast. This is typically done with similar transistors such as bipolar junction transistors (BJTs), and will include a base drive transformer and a diac starting circuit. Such a circuit topology is described in U.S. Pat. No. 6,847,175, issued Jan. 25, 2005 to Nerone, which is incorporated by reference herein in its entirety.

BRIEF DESCRIPTION OF THE INVENTION

In accordance with one aspect, a lighting ballast circuit is provided. The ballast includes a lamp portion that has contacts for receiving a light source. The ballast also includes an integrated circuit. The integrated circuit includes a first transistor and a second transistor in series with the first transistor, the first and second transistors being conductive in alternating periods of time. A first diode sits in an anti-parallel combination with the first transistor and substantially diminishes reverse current flow through the first transistor. A second diode sits in an anti-parallel combination with the second transistor and substantially diminishes reverse current flow through the second transistor. A drive portion supplies drive signals to the integrated circuit.

In accordance with another aspect, an integrated circuit is provided. A first transistor and a second transistor are in series with each other. A first diode sits in an anti-parallel combination with the first transistor and substantially diminishes reverse current flow through the first transistor. A second diode sits in an anti-parallel combination with the second transistor and helps prevent reverse current flow through the second transistor.

In accordance with another aspect, a method of manufacturing a monolithic integrated circuit is provided. First and second bipolar junction transistors are placed in a series relationship with respective emitters connected at a first contact and respective bases connected at a second contact. A first diode is placed in an anti-parallel relationship with the first transistor, connected with a positive bus voltage. A second diode is placed in an anti-parallel relationship with the second transistor, connected with a negative bus voltage.

In accordance with another aspect, a method of powering a lamp is disclosed. A first AC signal is provided to a monolithic integrated circuit. The first AC signal is converted into a DC signal by a rectifier integrated into the integrated circuit. The DC signal is converted into a second AC signal with first and second transistors resident on the integrated circuit. The transistors are protected by diodes integrated into the integrated circuit in anti-parallel relationships with the transistors. The second AC signal is provided to a lamp with the integrated circuit.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE INVENTION

Figure 1:
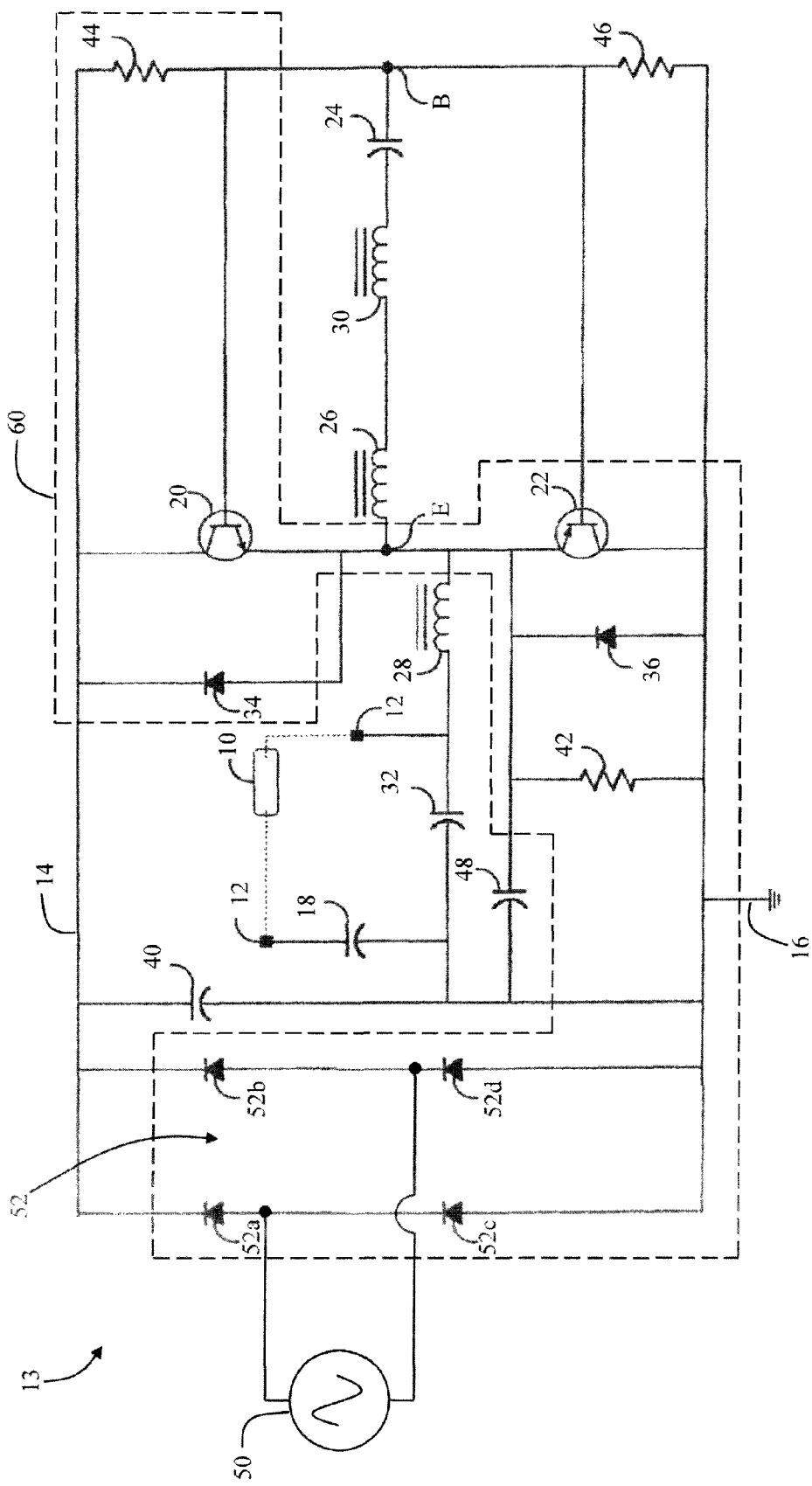
FIG. 1 is a circuit diagram of a ballast circuit with components indicated that are included on an ASIC.

With reference to FIG. 1, a light source 10 is operably connected between contacts 12, of a ballast circuit 13. In one embodiment, the circuit 13 has a DC bus rail 14. The DC bus rail 14 can have a potential on the order of 450 V. The circuit 13 is referenced at point 16 to ground. The light source 10 is preferably a fluorescent lamp that operates at a particular frequency or range of frequencies. A DC blocking capacitor 18 is included between the lamp and ground. The ballast circuit provides AC power at the operational frequency of the lamp.

In order to convert a DC signal into an AC signal, a first transistor 20 and a second transistor 22 alternate between periods of conductivity and periods of non-conductivity, out of phase with each other. That is, when the first transistor 20 is conductive, the second transistor 22 is non-conductive, and vice-versa. The action of alternating periods of conduction of the transistors provides an AC signal across the contacts 12. In one embodiment, the first transistor is a 13003 type transistor, and the second transistor is a 93003 type transistor.

Each transistor 20, 22 has a respective base and emitter. The voltage from base to emitter on either transistor defines the conduction state of that transistor. That is, the base-to-emitter voltage of transistor 20 defines the conductivity of transistor 20 and the base-to-emitter voltage of transistor 22 defines the conductivity of transistor 22. As shown, the emitters of the two transistors 20, 22 are connected at a common node E. The bases of the transistors 20, 22 are connected at a control node B. The single voltage between the control node B and the common node E determines the conductivity of both transistors 20, 22. The collectors of the transistors 20, 22 are connected to the bus voltage 14 and ground 16, respectively.

A gate drive circuit, connected between the common node E and the control node B controls the conduction states of the transistors 20, 22. The gate drive circuit includes a serial capacitor 24, and a drive inductor 26 that is connected to a resonant inductor 28 at the common node E. The other end of the drive inductor 26 is coupled to a phase inductor 30. The phase inductor 30 is used to adjust the phase angle of the base-emitter voltage appearing between nodes E and B. The drive inductor 26 provides a driving energy for the operation of the drive circuit. The resonant inductor 28 along with a resonant capacitor 32 connected between nodes 14 and 18 determine the operating frequency of the lamp 10. The serial capacitor 24 charges to provide sufficient voltage to turn the first transistor 20 conductive. During steady state operation of the ballast, the serial capacitor 24 aids in switching between the two transistors 20, 22.

In one embodiment, when one transistor is conductive, the other is non-active or non-conductive. That is, there are no periods of time when both transistors are operative or conductive. To substantially diminish current flow in a reverse direction through the first transistor 20 while the second transistor 22 is conductive, a first diode 34 is included in the circuit in an anti-parallel relationship with respect to the first transistor 20. The first diode 34 provides a current shunt that redirects current from flowing in a reverse direction across the first transistor 20. Similarly, a second diode 36 is disposed in an anti-parallel relationship with the second transistor 22 that substantially diminishes current flow in a reverse direction across the second transistor 22 while the first transistor 20 is conductive. Preferably, the diodes 34, and 36 are PIN diodes. PIN diodes have an intrinsic semi-conducting region between a p-doped region and an n-doped region. In one embodiment, the diodes used are 1N4004 type diodes. It is to be appreciated, of course, that other diodes having the required characteristics may also be used.

Additionally, the ballast circuit includes a smoothing capacitor 40 between the bus voltage 14 and ground 16 to smooth abnormalities and noise in the bus voltage signal. Starting resistors 42, 44, 46 prevent current in the ballast circuit from exceeding tolerable levels during startup, before the capacitors and inductors are charged. A so-called snubbing capacitor 48 is located between the node E and ground 16.

An alternating current source 50 provides power to the ballast. The AC signal is converted to a DC signal by a rectifier 52. The rectifier 52 shown in FIG. 1 is a full wave rectifier that includes four diodes 52a, 52b, 52c, and 52d. Alternately, a half-wave rectifier could also be used. Additional smoothing and shaping circuitry is also contemplated. As mentioned previously, the AC source 50 and the rectifier 52 combine to provide a DC signal on the order of substantially 450 Volts, but certainly other potentials are possible depending on the intended application.

Figure 2:
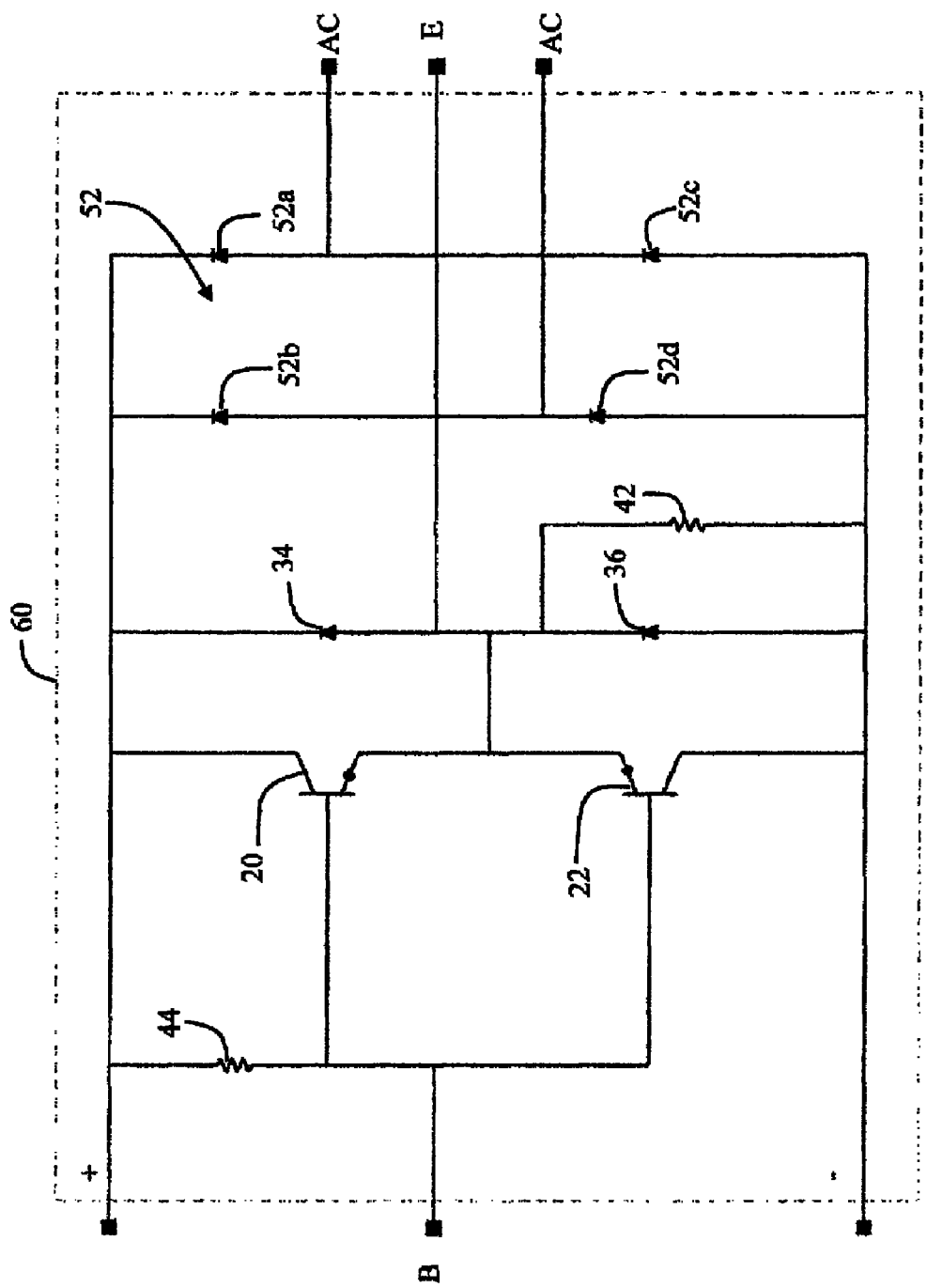
FIG. 2 is a circuit diagram of an ASIC that takes the place of the components indicated in FIG. 1

The circuit of FIG. 1 can be simplified to provide a ballast that performs the same function, but is easier and less expensive to manufacture, and more robust and resistant to failure. The dashed lines in FIG. 1 represent portions of the ballast that are included in an application specific integrated circuit (ASIC). FIG. 2 shows the circuit topology of an ASIC 60 that includes the indicated components of FIG. 1. In FIG. 2, like components are given the same reference numerals as FIG. 1. As shown in the embodiment of FIG. 2, the ASIC 60 is a six pin chip. Two pins are connected to the AC power source. One pin is connected to the circuit bus 14, and one pin is connected to circuit ground 16. The remaining two pins represent nodes E and B, that is, the base and emitter nodes. Optionally, the rectifier 52 could be external, and does not necessarily have to be housed on the ASIC 60. Additional circuitry such as voltage clamps, protective diodes, and the like, could also be included on the ASIC 60. Of course, the ASIC 60 could have more pins, and the ASIC 60 could carry additional circuitry, such as end-of-life testing circuitry, monitoring/diagnostic circuitry, or the like.

Figure 3:
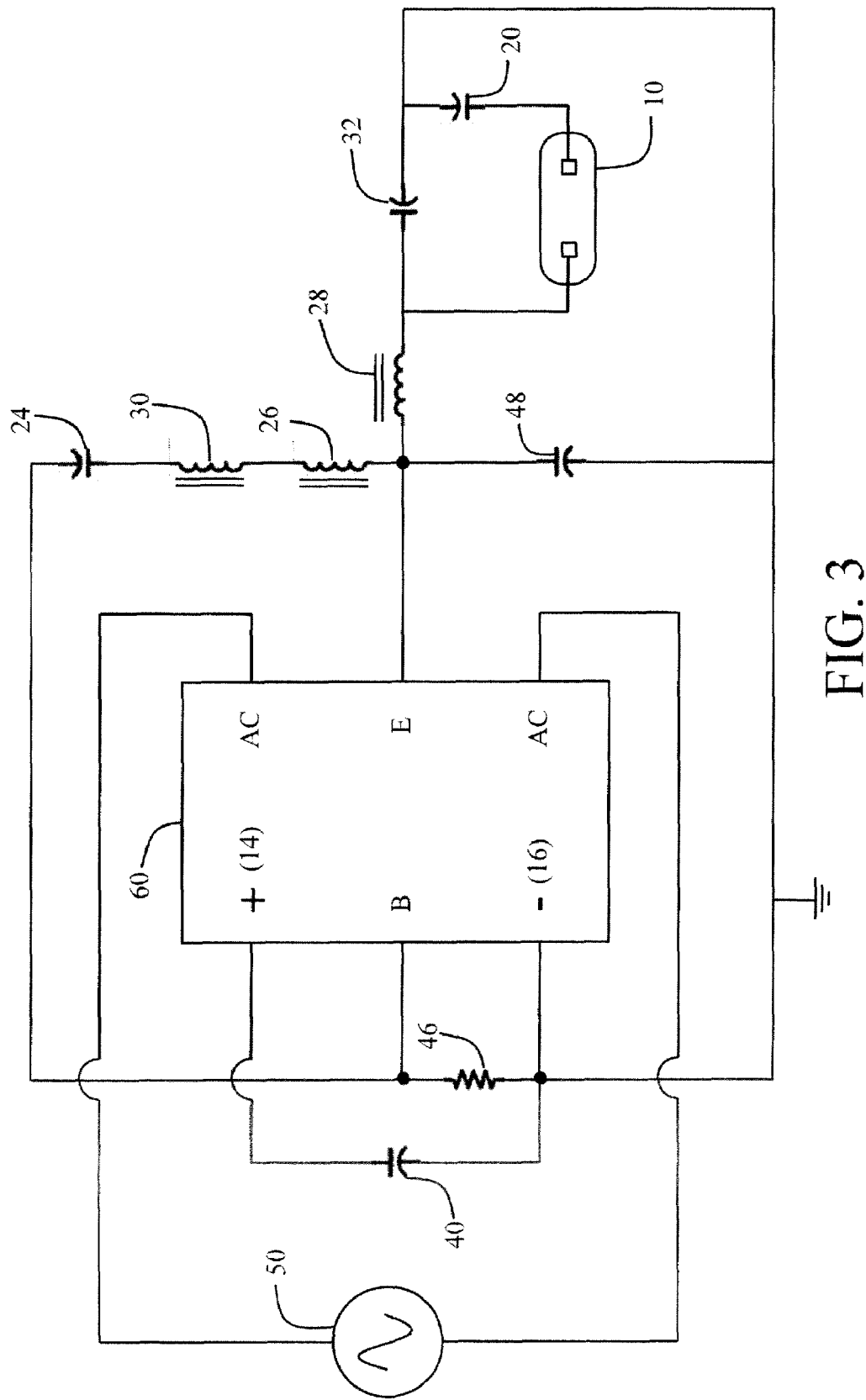
FIG. 3 is a depiction of the ballast circuit of FIG. 1 with the ASIC of FIG. 2 substituted for the indicated components in FIG. 1.

FIG. 3 depicts the circuit of FIG. 1, with the ASIC 60 in place. Again, like components are indicated with like reference numerals.

In the illustrated embodiment, the ASIC 60 is a monolithic unit. This has the advantage of replacing the discrete circuit components and housing them on a single crystal substrate. By taking the discrete complimentary pair of transistors, and their associated starting resistors and companion diodes, the overall cost of the ballast is decreased, and reliability is increased. Additionally, the ballast does not take up as much physical space upon being implemented into a product.

Exemplary component values for the ballast circuit are as follows:

| Part Description | Part Number | Nominal Value |
|---|---|---|
| Lamp | 10 | 23 watts |
| DC Bus Voltage | 14 | 450 Volts |
| Circuit Reference | 16 | 0 Volts |
| DC Blocking Capacitor | 18 | 47 nf |
| First Transistor | 20 | 13003 |
| Second Transistor | 22 | 93003 |
| Drive Inductor | 26 | 360 µH |
| Resonant Inductor | 28 | 3.6 mH |
| Phase Inductor | 30 | 150 µH |
| Resonant Capacitor | 32 | 1.5 nf |
| First Diode | 34 | 1N4004 |
| Second Diode | 36 | 1N4004 |
| Smoothing Capacitor | 40 | 220 nf |
| Starting Resistor | 42 | 560 kΩ |
| Starting Resistor | 44 | 560 kΩ |
| Starting Resistor | 46 | 560 kΩ |
| Snubbing Capacitor | 48 | 120 pf |

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A lighting ballast circuit comprising:
a lamp portion that has contacts for receiving a light source;
a monolithic integrated circuit including:
    a first transistor;
    a second transistor in series with the first transistor, the first and second transistors being conductive in alternating cycles,
    a first diode in an anti-parallel combination with the first transistor that substantially diminishes reverse current flow through the first transistor,
    a second diode in an anti-parallel combination with the second transistor that substantially diminishes reverse current flow through the second transistor, and
    a rectifier for converting alternating current from a voltage source to direct current and providing the direct current to the first and second transistors; and
a drive portion configured to supply drive signals to the monolithic integrated circuit.

2. The lighting ballast as set forth in claim 1, wherein the rectifier is a full wave rectifier.

3. The lighting ballast as set forth in claim 1, wherein the rectifier supplies a bus signal of substantially 450 Volts.

4. The lighting ballast as set forth in claim 1, wherein the integrated circuit further includes:
at least one starting resistor that prevents current in the ballast circuit from exceeding tolerable levels during startup.

5. The lighting ballast as set forth in claim 1, wherein the transistors are bipolar junction transistors.

6. The lighting ballast as set forth in claim 5, wherein the integrated circuit further includes:
contacts to accept an AC signal from an external AC voltage source;
contacts to connect to positive and negative circuit buses;
a contact connected to emitters of the transistors; and
a contact connected to bases of the transistors.

7. A monolithic integrated circuit comprising:
a first transistor having a first emitter and a first base;
a second transistor having a second emitter and a second base, the second transistor in series with the first transistor wherein the first emitter and second emitter are connected at a common emitter node and the first base and second base are connected at a common base node;
a first diode in an anti-parallel combination with the first transistor that substantially diminishes reverse current flow through the first transistor;
a second diode in an anti-parallel combination with the second transistor that substantially diminishes reverse current flow through the second transistor; and
a rectifier for converting an AC input signal to a DC voltage signal and providing the DC voltage signal to the first and second transistors.

8. The integrated circuit as set forth in claim 7, wherein the first and second transistors are bipolar junction transistors.

9. The integrated circuit as set forth in claim 8, further including:
first and second contacts that are connected to an external AC voltage source;
a third contact that is connected to a positive bus rail;
a fourth contact that is connected to a negative bus rail.

10. The integrated circuit as set forth in claim 7, wherein the rectifier is a full wave bridge rectifier.

11. A method of manufacturing a monolithic integrated circuit comprising:
placing first and second bipolar junction transistors in a series relationship with respective emitters connected at a first contact and respective bases connected at a second contact;
placing a first diode in an anti-parallel relationship with the first transistor, connected with a positive bus voltage;
placing a second diode in an anti-parallel relationship with the second transistor, connected with a negative bus voltage; and
placing a rectifier between the transistors and an external AC voltage source for converting an AC signal from the external AC source into a DC signal for the transistors.

12. The method as set forth in claim 11, wherein the rectifier is a full wave rectifier.

13. The method as set forth in claim 11, further including:
placing a first startup resistor between the positive bus voltage and the bases of the transistors; and
placing a second startup resistor in parallel with the second diode.

14. A method of powering a lamp comprising:
providing a first AC signal to a monolithic integrated circuit;
converting the first AC signal into a DC signal with a rectifier resident on the integrated circuit;
converting the DC signal into a second AC signal with first and second transistors resident on the integrated circuit; and
protecting the transistors with diodes integrated into the integrated circuit in anti-parallel relationships with the transistors, the transistors connected to a common emitter node and common base node; and,
providing the second AC signal to the lamp with the integrated circuit.

15. A method as set forth in claim 14, wherein the monolithic integrated circuit comprise:
a first bipolar junction transistor;
a second bipolar junction transistor in series with the first bipolar junction transistor, the first and second bipolar junction transistors being conductive in alternating cycles,
a full wave rectifier for converting alternating current from a voltage source to direct current and providing the direct current to the first and second bipolar junction transistors; a starting resistor that prevents current in the monolithic integrated circuit from exceeding tolerable levels during startup; and
a drive portion configured to supply drive signals to the monolithic integrated circuit.

16. The method of claim 15, wherein the first bipolar junction transistor includes a first emitter terminal and a first base terminal; the second bipolar junction transistor includes a second emitter terminal and a second base terminal, the second bipolar junction transistor in series with the first bipolar junction transistor wherein the first emitter terminal and second emitter terminal are connected at a common emitter node contact and the first base terminal and second base terminal are connected at a common base node contact.

* * * * *